F. W. BROCKSIEPER.
Gas Regulator.

No. 40,602.  Patented Nov. 17, 1863.

Witnesses  Inventor

UNITED STATES PATENT OFFICE.

FREDERICK WILLIAM BROCKSIEPER, OF BRIDGEPORT, CONNECTICUT.

IMPROVEMENT IN GAS-REGULATORS.

Specification forming part of Letters Patent No. 40,602, dated November 17, 1863.

*To all whom it may concern:*

Be it known that I, FREDERICK WILLIAM BROCKSIEPER, of the city of Bridgeport, county of Fairfield, and State of Connecticut, have invented a new and useful Improvement in the Mode of Constructing Gas Burner Regulators; and I do hereby declare that the following is a correct description thereof, reference being had to the accompanying drawings, and to the letters of reference marked thereon.

The nature of my invention consists in the arrangement and application of an adjusting-screw to gas-burner regulators to regulate and equalize the supply and flow of gas to the outlet of the burner tip.

To enable others skilled in the art to make and use my invention, I will proceed to describe the construction and operation.

Figure 1:
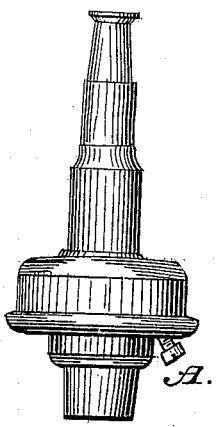
Figure 2:
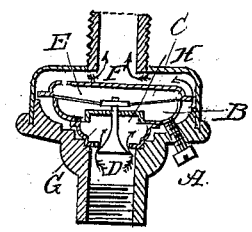
Figure 3:
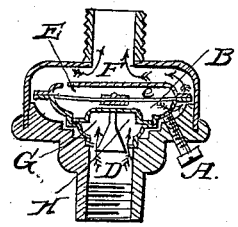

The drawing, Figure 1, is a view of the regulator and tip; Fig. 2, a vertical section of the regulator, showing the position of the regulating and adjusting screw A when nearly closing, the orifice B, forming the small space for the gas to pass through. Fig. 3 is a section of the same, showing the position of the screw when open to allow of a large flow of the gas.

Letter A is the adjusting and regulating screw; B, the orifice in the case for the gas to flow through to the burner-tip; C, the elastic movable diaphragm; D, conical valve suspended to diaphragm. E, is a protecting chamber over diaphragm; F, cover to the same. G is the case containing the diaphragm-valve, &c.; H, a bridge to support the valve.

I do not claim as my invention the form and arrangement of regulator or the diaphragm or the valve.

My invention and improvement is the arrangement and application of the regulating and adjusting screw A, or its equivalent, to regulate the flow of gas to the burner-tip both at the point of burning and at the meter, all in combination with the diaphragm C and valve D. The protecting-chamber E and the cover F are to protect the elastic diaphragm and valve from injury. The case G is formed to receive the diaphragm C and valve D. In the side of the case G and under the elastic diaphram is a perforation or orifice, B, of a size suitable for the flow of gas after entering through the opening round the valve D. Into the orifice B the point of the regulating-screw A enters, and the area of the opening is reduced in size by screwing up the regulating-screw A to the required distance, and, of course, will be enlarged by lowering the same to allow a larger flow. The object of this is to regulate the flow of gas from the case after passing the valve D, and before entering the space around the case G and passing up through the burner-tip.

Fig. 2 describes the position of the screw A when the point enters the orifice B and nearly closes the orifice, so that a small quantity of gas will pass through.

Fig. 3 describes the position of the screw A when lowered to enlarge the space to admit a full flow of gas and make it equal to the quantity required to pass out at the burner-tip. For instance, if the burner-tip is made to consume, say, twelve feet of gas per hour when fully open, it can be reduced and regulated by turning up or down the screw A into the opening B for the flow of the gas, to any required quantity less than twelve feet, for if the tip allows twelve feet per hour to pass, and it is required to use, say, only three feet per hour, (more or less,) that quantity only will pass through the orifice B when reduced by the screw A, and will burn that reduced quantity only with a full light constantly, because the diaphragm C rises and falls correspondingly with the opening made by the screw whatever force there may be on.

My regulator, being attached to or near the meter, will regulate the flow of gas to any number of burners when they are all of the same height as correctly as when supplying only one burner.

The utility of my screw-regulator is that one size can be used to regulate any size burner, and can reduce a twelve-foot burner down to any size under twelve feet and still burn with a full light, agreeable to the size required, without waste or smell, and the amount of gas consumed can be always accurately ascertained.

The simplicity and economy of my regulator is of great importance to the consumers of gas.

What I claim as my invention, and desire to secure by Letters Patent, is—

The arrangement and application of the regulating-screw A, or its equivalent, in combination with the elastic diaphragm C and valve D, in the manner and for the purpose substantially as herein set forth and described.

F. W. BROCKSIEPER.

Witnesses:
　WM. VINE,
　AUGUSTUS TISCHENDORF.